United States Patent
Wang et al.

(10) Patent No.: US 10,298,512 B2
(45) Date of Patent: May 21, 2019

(54) SYSTEM AND METHOD FOR PERFORMING RESOURCE ALLOCATION FOR A HOST COMPUTER CLUSTER

(71) Applicant: VMware, Inc., Palo Alto, CA (US)

(72) Inventors: Limin Wang, San Jose, CA (US); Anne Holler, Los Altos, CA (US); Duncan Epping, Helmond (NL); Frank Denneman, Purmerend (NL); Ganesha Shanmuganathan, Santa Clara, CA (US); Kalyanaraman Shankari, Mountain View, CA (US); Andrew Mitchell, Belgrave Heights (AU)

(73) Assignee: VMware, Inc., Palo Alto, CA (US)

( * ) Notice: Subject to any disclaimer, the term of this patent is extended or adjusted under 35 U.S.C. 154(b) by 354 days.

(21) Appl. No.: 14/752,053

(22) Filed: Jun. 26, 2015

(65) Prior Publication Data
US 2016/0380905 A1    Dec. 29, 2016

(51) Int. Cl.
| | | |
|---|---|---|
| *H04L 12/911* | (2013.01) | |
| *H04L 12/24* | (2006.01) | |
| *H04L 12/26* | (2006.01) | |
| *G06F 9/455* | (2018.01) | |
| *G06F 9/50* | (2006.01) | |

(52) U.S. Cl.
CPC .......... *H04L 47/70* (2013.01); *G06F 9/45558* (2013.01); *G06F 9/5077* (2013.01); *H04L 41/0896* (2013.01); *H04L 43/0817* (2013.01); *G06F 9/45533* (2013.01)

(58) Field of Classification Search
None
See application file for complete search history.

(56) References Cited

U.S. PATENT DOCUMENTS

| | | | | |
|---|---|---|---|---|
| 9,542,219 | B1 * | 1/2017 | Bryant | G06F 9/45558 |
| 2010/0333092 | A1 * | 12/2010 | Stefansson | G06F 9/44505 718/100 |
| 2013/0042123 | A1 * | 2/2013 | Smith | G06F 9/5077 713/300 |
| 2015/0058400 | A1 * | 2/2015 | Parikh | H04L 67/1002 709/203 |
| 2015/0212856 | A1 * | 7/2015 | Shanmuganathan | G06F 9/5027 709/226 |
| 2016/0216991 | A1 * | 7/2016 | Ansari | G06F 9/45558 |
| 2016/0323372 | A1 * | 11/2016 | Parikh | G06F 9/5005 |

OTHER PUBLICATIONS

Epping, Dunan, Yellow-Bricks, "Custom shares on a Resource Pool, scripted," http://www.yellow-bricks.com/2010/02/24/custom-shares-on-a-resource-pools-scripted/, Feb. 24, 2010.

* cited by examiner

*Primary Examiner* — Philip J Chea
*Assistant Examiner* — Hassan A Khan
(74) *Attorney, Agent, or Firm* — Loza & Loza LLP (57) ABSTRACT

System and method for performing resource allocation for a host computer cluster use resource allocation weight scores for resource nodes in a cluster resource allocation hierarchy of the host computer cluster based on the number of powered-on clients in the resource nodes.

27 Claims, 9 Drawing Sheets

SYSTEM AND METHOD FOR PERFORMING RESOURCE ALLOCATION FOR A HOST COMPUTER CLUSTER

BACKGROUND

Resource pools can be used to hierarchically partition available resources in a host computer cluster, which include, for example, CPU resources and memory resources. A parent resource pool can contain one or more child resource pools, one or more resource-consuming clients, such as virtual machines (VMs), or both. Resource pools and clients that are at the same level of a resource allocation hierarchy are called siblings.

Resource allocation techniques for computer systems with resource-consuming clients, such as VMs, are important to ensure that the clients are operating at desired or target levels. For example, if a VM is powered on a host computer or migrated to a host computer, a resource allocation element needs to generate resource allocation settings of the VM such that appropriate resources can be assigned to the VM. Conventional resource allocation techniques generally do not automatically allow a client to inherit the resource allocation priority of a parent resource pool that contains the client. For example, due to sibling rivalry within a resource pool, conventional resource allocation techniques may not designate a client in a resource pool with a higher resource allocation priority with higher priority for resource allocation than a client in a resource pool with a lower resource allocation priority. In addition, conventional resource allocation techniques generally do not guarantee a client a minimum amount of resources. For example, if a client with a relatively large resource allocation requirement (e.g., a VM with 16 virtual CPU (vCPU) and 1 TB memory) is placed next to a resource pool containing other clients at the same level of a resource allocation hierarchy, the client with the relatively large resource allocation requirement can deprive the clients inside the resource pool of resources and cause a denial of service for the clients inside the resource pool.

SUMMARY

System and method for performing resource allocation for a host computer cluster use resource allocation weight scores that are generated for resource nodes in a cluster resource allocation hierarchy of the host computer cluster based on the number of powered-on clients in the resource nodes.

A method for performing resource allocation for a host computer cluster in accordance with an embodiment of the invention comprises obtaining a cluster resource allocation hierarchy of the host computer cluster and generating resource allocation weight scores for resource nodes in the cluster resource allocation hierarchy based on the number of powered-on clients in the resource nodes. In some embodiments, the steps of this method are performed when program instructions contained in a computer-readable storage medium is executed by one or more processors.

A computer system for performing resource allocation for a host computer cluster in accordance with an embodiment of the invention comprises a processor and a resource allocation module operably connected to the processor. The resource allocation module is configured to obtain a cluster resource allocation hierarchy of the host computer cluster and generate resource allocation weight scores for resource nodes in the cluster resource allocation hierarchy based on the number of powered-on clients in the resource nodes.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
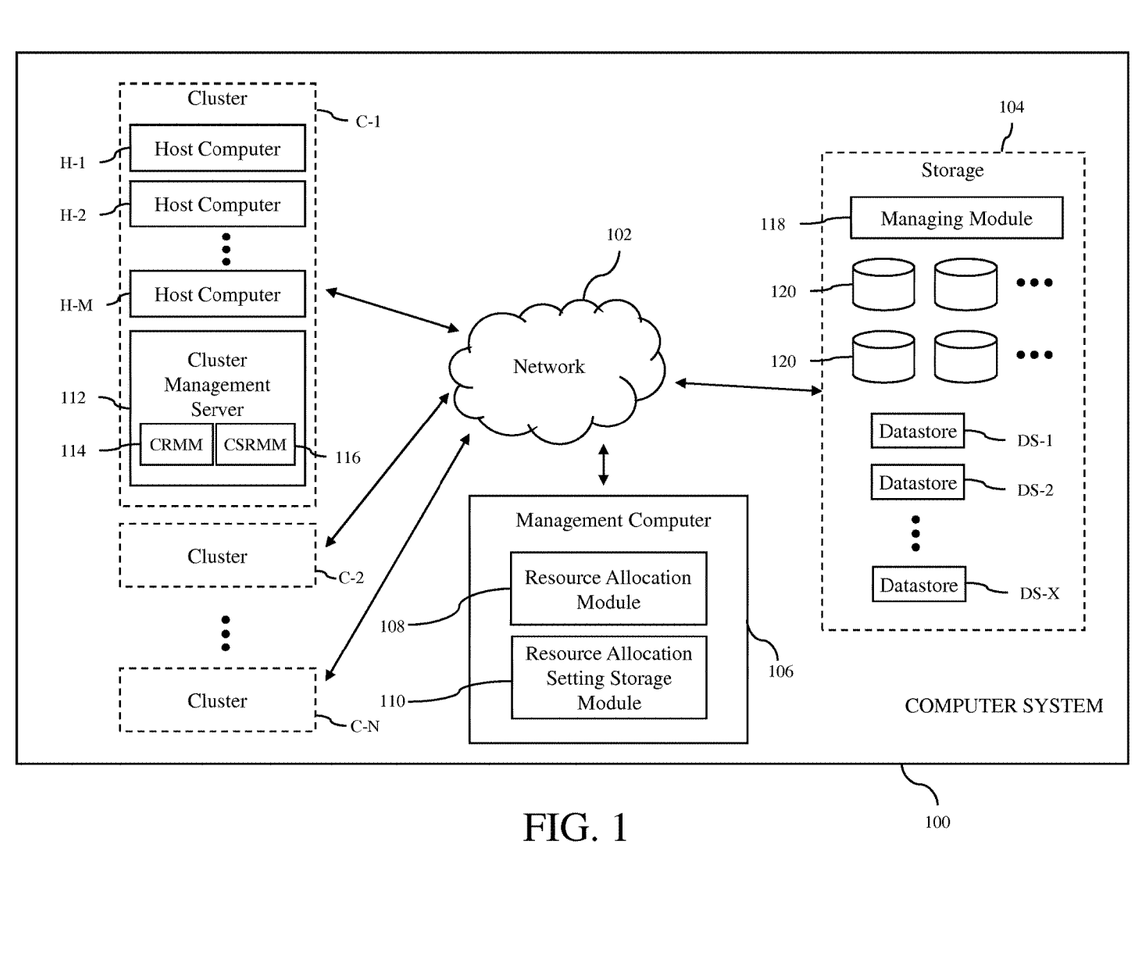
FIG. 1 is a block diagram of a computer system in accordance with an embodiment of the invention.

Turning now to FIG. 1, a computer system 100 in accordance with an embodiment of the invention is shown. The computer system may be, for example, a computer network system. As shown in FIG. 1, the computer system includes a network 102, clusters C-1, C-2 . . . C-N (where N is a positive integer) of host computers, storage 104 and a management computer 106 with a resource allocation module 108 and a resource allocation setting storage module 110. The clusters of host computers are used to support or host clients that can execute various applications. The exact number of host computer clusters included in the computer system can be any number of clusters from one to tens of clusters or more. The host computers of the different clusters may be connected to the storage and the management computer via the network. Thus, each of the host computers in the clusters and the management computer are able to access the storage via the network and may share the resources provided by the storage. Consequently, any process running on any of the host computers and the management computer may also access the storage via the network.

In the illustrated embodiment, each of the clusters C-1, C-2 . . . C-N includes a number of host computers H-1, H-2 . . . H-M (where M is a positive integer) and a cluster management server 112. The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have a different number of host computers. The host computers are physical computer systems that host or support one or more clients so that the clients are executing on the physical computer systems. As used herein, the term "client" is any software entity that can run on a computer system, such as a software application, a software process, a virtual machine (VM) and a "container" that provides system-level process isolation. The host computers may be servers that are commonly found in datacenters. As an example, the host computers may be servers installed in one or more server racks. In an embodiment, the host computers of a cluster are located within the same server rack.

Figure 2:
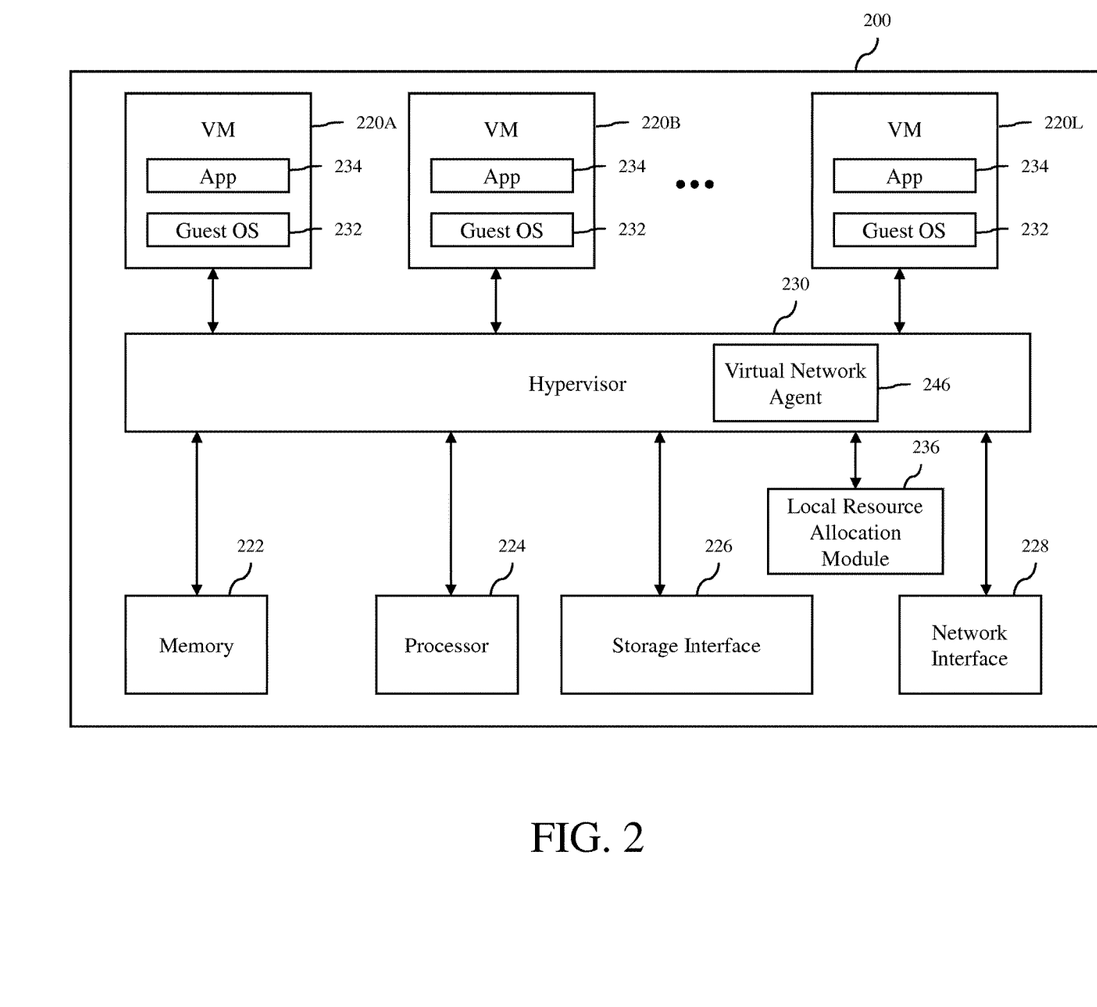
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs in this embodiment. The number of VMs supported by the host computer can be anywhere from one to more than one thousand. The exact number of VMs supported by the host computer is only limited by the physical resources of the host computer. The VMs share at least some of the hardware resources of the host computer, which include system memory 222, one or more processors 224, a storage interface 226, and a network interface 228. The system memory, which may be random access memory (RAM), is the primary memory of the host computer. The processor can be any type of a processor, such as a central processing unit (CPU) commonly found in a server. The storage interface is an interface that allows that host computer to communicate with the storage 104. As an example, the storage interface may be a host bus adapter or a network file system interface. The network interface is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide virtualized computer systems that give the appearance of being distinct from the host computer and from each other. Each VM includes a guest operating system (OS) 232 and one or more guest applications (APP) 234. The guest operating system manages virtual system resources made available to the corresponding VM by the hypervisor 230, and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 may also include a local resource allocation module 236 that operates as part of a resource management system, such as a distributed resource scheduler system, to manage resources consumed by the VMs 220A, 220B . . . 220L. The local resource allocation module in each host computer can cooperatively operate with the local resource allocation modules in the other host computers of the network computer system 100 to generate resource allocation settings and perform resource scheduling, which includes balancing the loads of software processes and/or storage resource scheduling, among the host computers H-1, H-2 . . . H-M of the host computer clusters C-1, C-2 . . . C-N. Although the local resource allocation module is illustrated in FIG. 2 as being separate from the hypervisor 230, the local resource allocation module may be implemented as part of the hypervisor. In some embodiments, the local resource allocation module is implemented as software programs running on the host computer. However, in other embodiments, the local resource allocation module may be implemented using any combination of software and hardware.

The host computer 200 may further include a virtual network agent 246, which operates within the hypervisor 230 to provide virtual networking capabilities, such as bridging, L3 routing, L2 switching and firewall capabilities, so that software defined networks or virtual networks can be created. In a particular embodiment, the virtual network agent may be part of a VMware NSX™ virtual network product installed in the computer system 100.

Turning back to FIG. 1, each of the cluster management servers 112 in the clusters C-1, C-2 . . . C-N operates to monitor and manage the host computers H-1, H-2 . . . H-M in the respective cluster. Each cluster management server may be configured to monitor the current configurations of the host computers and the clients, e.g., VMs, running on the host computers in the respective cluster. The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The "demand," or current usage, of the clients for the consumable resources, such as CPU, memory, network, and storage, are measured by the host computers hosting the clients and provided to the respective cluster management server.

The cluster management servers 112 may also perform various operations to manage the clients and the host computers H-1, H-2 . . . H-M in their respective clusters. As illustrated in FIG. 1, in an embodiment, each cluster management server includes a cluster resource management module (CRMM) 114, which can be enabled by a user, to perform resource allocations and load balancing in the respective cluster. The cluster resource management module operates to allocate available resources among clients running in the cluster based on a number of parameters, which may include predefined rules and priorities. The cluster resource management module may be configured to power down particular clients and/or host computers in the cluster to conserve power. The cluster resource management module may be further configured to perform initial placement or deployment of clients in the host computers of the respective cluster, as well as subsequent placement or migration of the existing clients in different host computers of the respective cluster. The cluster resource management module may further be configured or programmed to perform other operations to manage the cluster. Each cluster management server may also include a cluster storage resource management module (CSRMM) 116, which can be enabled by a user, to perform storage resource management for the respective cluster. The cluster storage resource management module is configured to place files of clients being placed or migrated, such as virtual disk files and configuration files, to particular volumes and/or datastores in the storage 104. The cluster resource management module and the cluster storage resource management module use various policies or rules to place clients, including files of the clients, to particular host computers and datastores. Some of these placement rules may involve resource requirements of the clients, such as computing, memory, network and storage requirements. Some of these placement rules may involve affinity or anti-affinity rules to selectively place clients in host computers and datastores, which may be mandatory or preferential. Affinity rules may specify that clients should be placed in the same host computer or that files of the clients should be placed in the same datastore. Anti-affinity rules may specify that clients should not be placed in the same host computer or that files of the clients should not be placed in the same datastore.

In some embodiments, each cluster management server 112 provides a user interface so that a user can input commands related to various aspects of cluster management. The user interface may be used to create storage profiles for clients running in the respective cluster. These storage profiles may list the storage capabilities that files of the clients, such as virtual disk file and configuration files, require to properly support the operation of the clients. The storage profile of a client is used by the cluster storage resource management module 116 to place the files of that client in appropriate datastore(s).

In some embodiments, the cluster management servers 112 may be physical computers with each computer including at least memory and one or more processors, similar to the host computer 200. In other embodiments, the cluster management servers may be implemented as software programs running on physical computers, such as the host computer 200 shown in FIG. 2, or virtual computers, such as the VMs 220A, 220B . . . 220L. In an implementation, the cluster management servers are VMware® vCenter™ servers with at least some of the features available for such servers, the cluster resource management modules 114 in the cluster management servers are VMware vSphere® Distributed Resource Schedulers™, and the cluster storage resource management modules 116 in the cluster management servers are VMware® Storage Distributed Resource Schedulers™.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers of the clusters C-1, C-2 . . . C-N, which can be accessed like any other storage device connected to computer systems. The storage may support taking "storage snapshot". Each storage snapshot provides a consistent view of the data content on the storage at a given point in time. In an embodiment, the storage can be accessed by entities, such as clients running on the host computers, using any file system, e.g., virtual machine file system (VMFS) or network file system (NFS). The storage includes one or more computer data storage devices 120, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 118, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. The same datastore may be associated with more than one cluster. For VMs, the datastores may be used to store virtual storage, e.g., virtual disks, used by each of the VMs, as well as other files needed to support the VMs, such as configuration files for the VMs. In addition, the datastores may be used to store snapshots of clients, e.g., VMs, which may include some or all of the files of the clients. One or more datastores may be associated with one or more host computers. Thus, each host computer is associated with at least one datastore. Some of the datastores may be grouped into one or more clusters of datastores, which are commonly referred to as storage pods.

The management computer 106 operates to manage the host computers H-1, H-2 . . . H-M of the clusters C-1, C-2 . . . C-N and/or the storage 104 of the computer system 100. The management computer may be configured to generate, modify and/or monitor the current configurations of the host computers and the clients running on the host computers, for example, VMs. The configurations may include hardware configuration of each of the host computers, such as CPU type and memory size, and/or software configurations of each of the host computers, such as operating system (OS) type and installed applications or software programs. The configurations may also include clustering information, i.e., which host computers are included in which clusters. The configurations may also include client hosting information, i.e., which clients, e.g., VMs, are hosted or running on which host computers. The configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource settings, such as limit, reservation, entitlement and share values for various resources, e.g., CPU, memory, network bandwidth and storage, which are consumed by the clients. In an embodiment, the management computer 106 may also be configured to generate, modify and/or monitor the current configuration of the storage 104, including the physical storage devices 120 and the datastores DS-1, DS-2 . . . DS-X of the storage.

In an embodiment, the resource allocation module 108 may be configured to perform various operations to manage the clients, the host computers H-1, H-2 . . . H-M, the clusters C-1, C-2 . . . C-N of host computers and the storage 104. As an example, the resource allocation module may be configured to initially place new clients onto one or more of the host computers in particular clusters and move existing clients to different host computers and/or different clusters. The resource allocation module can assign software processes to the host computer clusters in a manner that balances the loads of the software processes running on the host computer clusters. Processes, such as VMs, can be balanced based on allocation policies, resource demand, and the availability of resources provided by the host computer clusters. Balancing can be applied to computer resources such as processor time, i.e., CPU cycles, memory space, network bandwidth (including any type of input/output or bus bandwidth), storage space, power consumption, cache space, software licenses, and so on. To effectively balance the computing resources, a running VM can be migrated from one host computer cluster to another, in a process that is known as live VM migration. As another example, the resource allocation module may be configured to power down particular clients and/or host computers to conserve power. In order to perform these various operations, the resource allocation module may maintain requirements and preferences for the clients with respect to the host computers and the datastores. These requirements and preferences may include affinity or anti-affinity rules for some of the clients, which may be mandatory or preferential. For example, these affinity or anti-affinity rules may include rules that specify which clients should run on the same host computer or be kept on separate host computers. As another example, these affinity or anti-affinity rules may include rules that specify which host computers are acceptable to clients and which host computers are not. The management computer may be configured or programmed to perform other operations to manage the computer system 100. In an implementation, the management computer is a VMware vCenter™ server with at least some of the features available for such server.

The resource allocation setting storage module 110 is configured to store the resource allocation settings of the computer system 100. The resource allocation setting storage module can be an electronic, magnetic, optical, electromagnetic, infrared, or semiconductor system (or apparatus or device), or a propagation medium. Examples of the resource allocation setting storage module include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc. In some embodiments, the resource allocation setting storage module is a memory module, e.g., a random access memory (RAM), a read-only memory (ROM), or any other suitable memory, that can be used to store a cluster resource allocation hierarchy for a host computer cluster. As used herein, a cluster resource allocation hierarchy includes a hierarchical organization/relationship of one or more resource nodes (e.g., host computer cluster, resource pools and software clients) present in a host computer cluster and resource allocation settings (e.g., limits, reservations and shares) of the resource nodes. In one embodiment, the resource allocation setting storage module includes a cache component that caches a cluster resource allocation hierarchy for a host computer cluster. For example, the resource allocation setting storage module may include a computer cache that transparently stores a cluster resource allocation hierarchy for a host computer cluster so that future requests for the cluster resource allocation hierarchy can be served faster. In one embodiment, the resource allocation setting storage module stores a cluster resource allocation hierarchy of a host computer cluster. As used herein, a host resource allocation hierarchy includes a hierarchical organization/relationship of one or more resource nodes (e.g., host computer, resource pools and software clients) present in a host computer and resource allocation settings (e.g., limits, reservations and shares) of the resource nodes.

In one embodiment, the resource allocation module 108 partitions the aggregated resources (e.g., CPU resources and memory resources) of a host computer cluster in a hierarchical fashion using a resource pool (RP) abstraction. Partitioning the resources using the RP abstraction allows service providers (e.g., cloud providers) to group related clients (e.g., VMs) and provide performance isolation among resource groups. For example, resources in a company can be grouped in a resource cluster and each department in the company can be assigned its own resource pool in order to guarantee that one department does not consume all the resources available in the resource cluster. A parent resource pool can contain one or more child resource pools, one or more resource-consuming clients, such as VMs, or both. Resource pools and clients that are at the same level of a resource allocation hierarchy are called siblings. Resources allocated to clients (e.g., VMs), host computers, or resource pools (RPs) can be controlled by adjusting resource allocation/control settings, which may include reservation, limit and shares parameters. In one embodiment, a reservation is the minimum amount of physical resources guaranteed to be available to a VM, a host computer, or an RP even when the resources in a host computer cluster or a computer system are over-committed. A reservation can be expressed in absolute units, e.g., MHz for CPU reservations and MB for memory reservations. In one embodiment, a limit specifies the upper bound of the resources that can be allocated to a VM, a host computer, or an RP. In one embodiment, a limit is honored even when there are idle resources. As with reservations, limits can be specified in absolute units, e.g., MHz for CPU limits and MB for memory limits. In one embodiment, shares specify the relative priority of a VM, a host computer, or an RP in a host computer cluster. Shares are sometimes also referred to as weights. Unlike reservations and limits, shares can be specified in relative terms. The shares values assigned to VMs, host computers, or RPs can be used to determine how the excess resources are divided among the VMs, host computers, and RPs when there is contention in the computer system 100. The resource allocation/control settings for reservation, limit and shares are also referred to as RLS settings. In addition to the RLS settings, each resource allocated to a VM, a host computer, or an RP may have a size parameter. In one embodiment, the size parameter of CPU may be the number of virtual CPU (vCPUs) allocated for a VM and the size parameter of memory may be the size of the memory advertised to the guest operating system (OS) of a VM.

In one embodiment, the resource allocation module 108 generates resource allocation settings of resource nodes in a resource pool. The resource allocation settings of a resource node may include a resource allocation weight score that indicates the relative priority or importance of the resource node, which may be a client (e.g., a VM) or a resource pool. If a first resource node has a resource allocation weight score that is higher than the resource allocation weight score of a second resource node at the same resource hierarchical level of a resource pool as the first resource node, the first resource node is entitled to consume larger fraction of the total resources than the second resource node. For example, if a first client (e.g., a VM) has a resource allocation weight score that is twice the resource allocation weight score of a second client at the same resource hierarchical level of a resource pool, the first client is entitled to consume twice as much of the resource that the second client is entitled to consume. Resource allocation weight scores can be specific to a particular resource, such as CPU resource and memory resource. Alternatively, resource allocation weight scores can be applied to all of available resources, including CPU resources and memory resources.

In some embodiments, a resource allocation weight score of a resource node in a resource pool is classified as being high, normal, or low. In one embodiment, if a resource allocation weight score of a resource node is higher than a first threshold, the resource allocation weight score is determined as being high. If a resource allocation weight score of a resource node is higher than a second threshold but is lower than the first threshold, the resource allocation weight score is determined as being normal. If a resource allocation weight score of a resource node is lower than the second threshold, the resource allocation weight score is determined as being low. In this embodiment, the first threshold is higher than the second threshold. For example, the first threshold may be twice as high as the second threshold.

In some embodiments, the resource allocation module 108 sets resource allocation weight scores of resource nodes of a resource pool to express a proportional weight to each resource node, which can be a client (e.g., a VM) or a resource pool. Specifying resource allocation weight scores applies only to sibling clients or sibling resource pools, that is, clients or resource pools with the same parent in the resource pool hierarchy. Sibling resource nodes share resources according to their resource allocation weight scores, bounded by the guaranteed resource reservation (e.g., the reservation parameters) of the resource nodes and the upper limit of resource allocation (e.g., the limit parameters) of the resource nodes. The resource allocation module may allocate resources to a client based on the size of the client (e.g., the number of vCPUs and the memory size of the client). For example, if a virtual machine, VM-1, has 1 vCPU and another virtual machine, VM-2, has 2 vCPUs, and VM-1 and VM-2 are siblings in a resource allocation hierarchy, VM-2 will have an allocation weight score that is twice of the allocation weight score of VM-1 and the amount of CPU resource assigned to VM-2 is twice the amount of CPU resource assigned to VM-1.

In an embodiment, the resource allocation module 108 performs resource allocation for the computer system 100 by issuing two different application calls. The resource allocation module issues a periodic action call to perform load balancing, power management and fix constraint violations in the computer system. Additionally, the resource allocation module issues a resource allocation call to perform resource allocation for powering on/off and/or migrating/moving clients (e.g., VMs) between host computers in the computer system.

Figure 3:
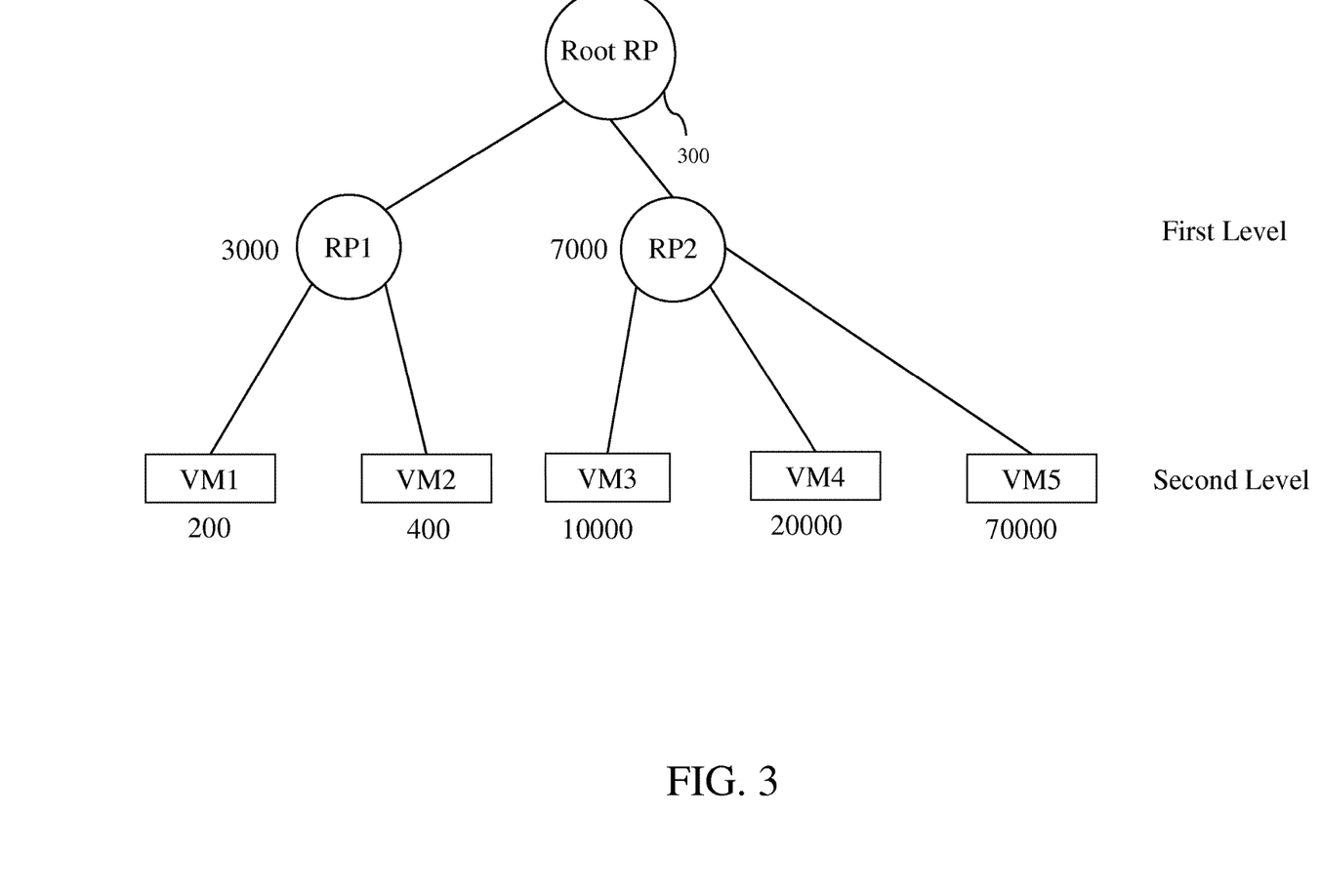
FIG. 3 depicts an example of a resource allocation scheme for a cluster-level hierarchical organization of the computer system depicted in FIG. 1.

FIG. 3 depicts an example of a resource allocation scheme for a cluster-level hierarchical organization of one of the host computer clusters C-1, C-2 . . . C-N depicted in FIG. 1. The cluster-level hierarchical organization and resource allocation parameters for resource nodes in the cluster resource allocation hierarchy depicted in FIG. 3 can be generated by the resource allocation module 108. As illustrated in FIG. 3, a root RP 300 is at the root of the hierarchy. The root RP includes hierarchically organized RPs, "RP1," "RP2," and VMs, "VM1," "VM2," "VM3," "VM4," and "VM5." In particular, the resources available in the root RP are divided into resource pools RP1, RP2, which are located in a first level or tier that is directly underneath the root RP. The resources in RP1 are shared by VM1 and VM2, which are located in a second level or tier that is underneath the first level. The resources in RP2 are used by VM3, VM4, VM5, which are located in the second level. In the root RP, RP1 and RP2 have shares values of 3000 and 7000, respectively. Consequently, RP1 and RP2 are entitled to/allocated 30% and 70% of the total resources in the root RP, respectively. In RP1, VM1 and VM2 have shares values of 200 and 400, respectively. Consequently, VM1 and VM2 are entitled to/allocated ⅓ and ⅔ of the total resources in RP1, respectively. In RP2, VM3, VM4 and VM5 have shares values of 10,000, 20,000 and 70,000, respectively. Consequently, VM3, VM4 and VM5 are entitled to/allocated 10%, 20%, and 70% of the total resources in RP2, respectively.

Figure 4:
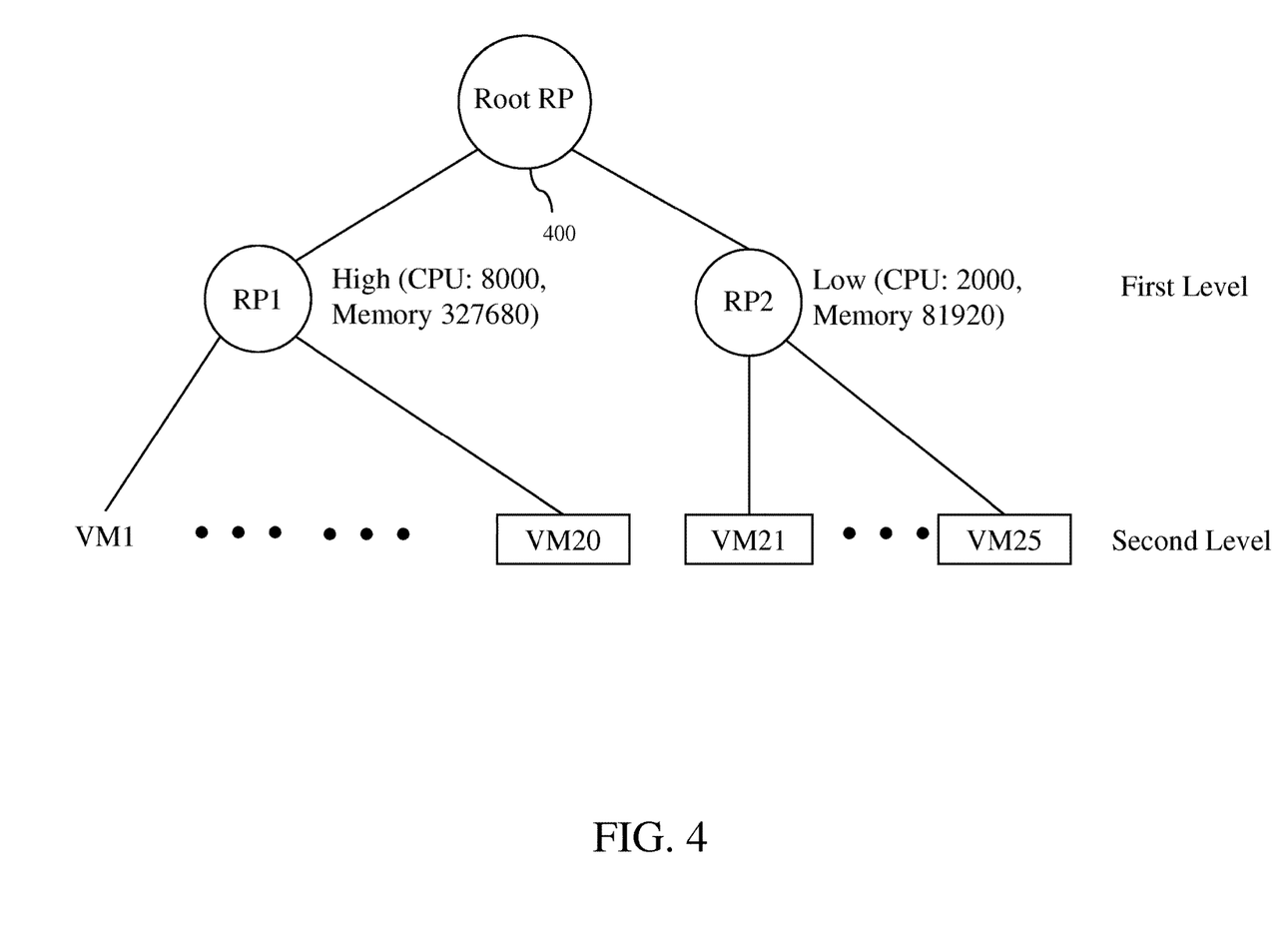
FIG. 4 depicts an example of a conventional resource allocation scheme for a cluster-level hierarchical organization with a sibling rivalry problem.

Conventional resource allocation techniques generally do not automatically allow a client to inherit the resource allocation priority of a parent resource pool that contains the client. For example, due to sibling rivalry within a resource pool, conventional resource allocation techniques may not designate a client in a resource pool with a higher resource allocation priority with higher priority for resource allocation than a client in a resource pool with a lower resource allocation priority. FIG. 4 depicts an example of a conventional resource allocation scheme for a cluster-level hierarchical organization with a sibling rivalry problem. As illustrated in FIG. 4, a root resource pool (RP) 400 is at the root of the hierarchy. The root RP includes hierarchically organized RPs, "RP1," "RP2," and VMs, "VM1"-"VM25." In particular, the resources available in the root RP are divided into resource pools RP1, RP2, which are located in a first level or tier that is directly underneath the root RP. The resources in RP1 are shared by VM1-VM20, which are located in a second level or tier that is underneath the first level. The resources in RP2 are used by VM21-VM25, which are located in the second level. In the root RP 400, RP1 has "high" shares for both CPU and memory (i.e., 8000 CPU shares and 327680 memory shares). RP2 has "low" shares for CPU and memory (i.e., 2000 CPU shares and 81920 memory shares). Consequently, RP1 and RP2 are entitled to/allocated 80% and 20% of the total resources in the root RP, respectively. A user expects that a VM in RP1 has higher priority of resource allocation than a VM in RP2. However, because RP1 has 20 child VMs and RP2 has only 5 child VMs, each VM in RP1 is entitled to/allocated the same amount of resources as each VM in RP2 (assuming VM1-VM25 have equal sizes and are equally active).

Figure 5:
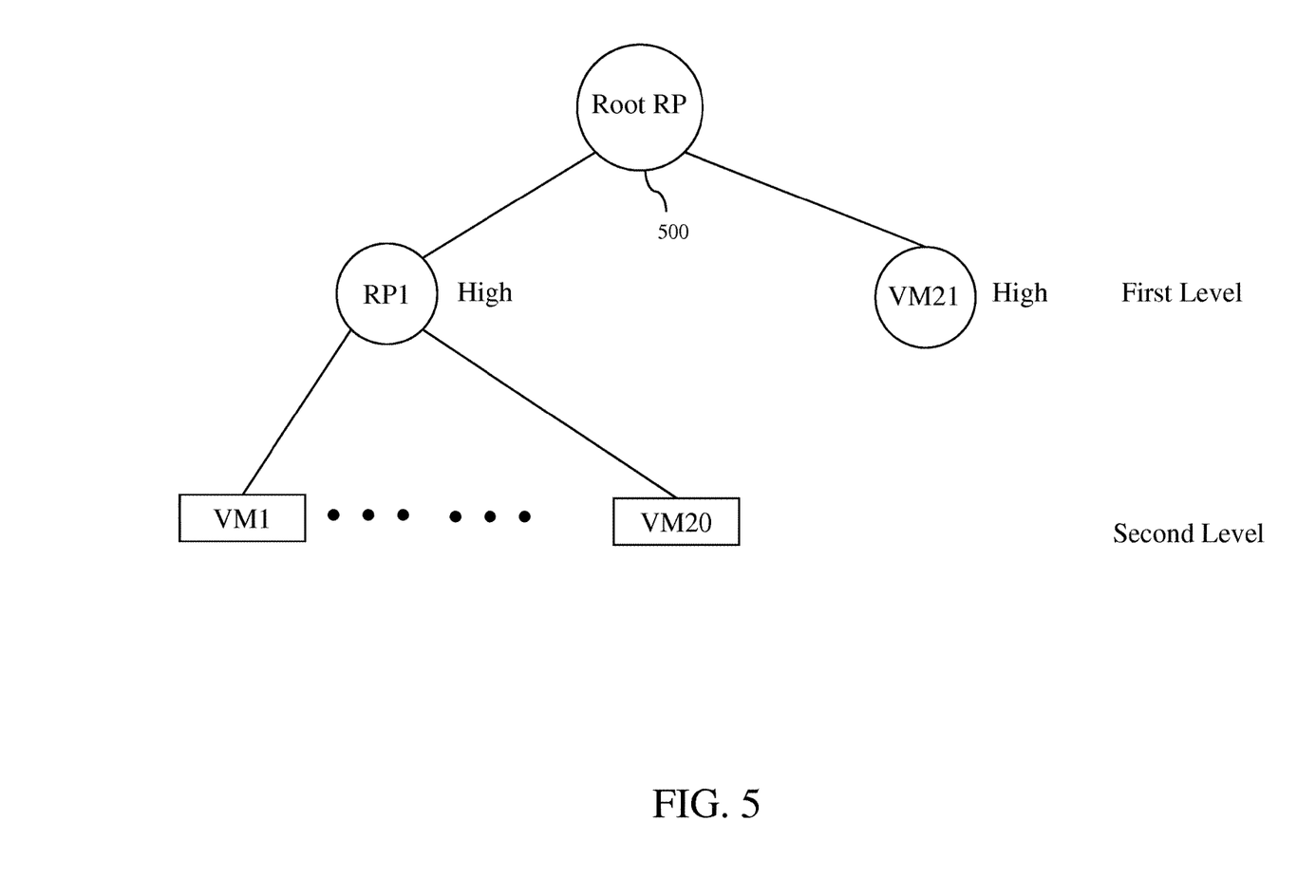
FIG. 5 depicts an example of a conventional resource allocation scheme for a cluster-level hierarchical organization with a resource deprivation problem.

In addition, conventional resource allocation techniques generally do not guarantee a client a minimum amount of resources. For example, if a client with a relatively large resource allocation requirement (e.g., a VM with 16 virtual CPU (vCPU) and 1 TB memory) is placed next to a resource pool containing other clients at the same level of a resource allocation hierarchy, the client with the relatively large resource allocation requirement can deprive the clients inside the resource pool of resources and cause a denial of service for the clients inside the resource pool. FIG. 5 depicts an example of a conventional resource allocation scheme for a cluster-level hierarchical organization with a resource deprivation problem. As illustrated in FIG. 5, a root RP 500 is at the root of the hierarchy. The root RP includes hierarchically organized RP, "RP1," and VMs, "VM1"-"VM21." In particular, the resources available in the root RP are divided into RP1 and VM21, which are located in a first level or tier that is directly underneath the root RP. The resources in RP1 are shared by VM1-VM20, which are located in a second level or tier that is underneath the first level. In the root RP, RP1 and VM21 have the same shared value and each is entitled half of the total resources in the root RP. A user expects that a VM in RP1 has the same priority of resource allocation as VM21. However, because RP1 has 20 child VMs, each VM in RP1 is entitled to/allocated ¹⁄₂₀ of resources as VM21 is entitled to/allocated (assuming VM1-VM21 have equal sizes and are equally active).

Compared to conventional resource allocation techniques, the resource allocation module 108 can allow a client to inherit the resource allocation priority of a parent resource pool that contains the client and guarantee a client a minimum amount of resources. In some embodiments, the resource allocation module 108 generates resource allocation weight scores for resource nodes in a cluster resource allocation hierarchy of one of the host computer clusters C-1, C-2 . . . C-N based on the number of powered-on clients in the resource nodes and/or the size of powered-on clients in the resource nodes.

Figure 6:
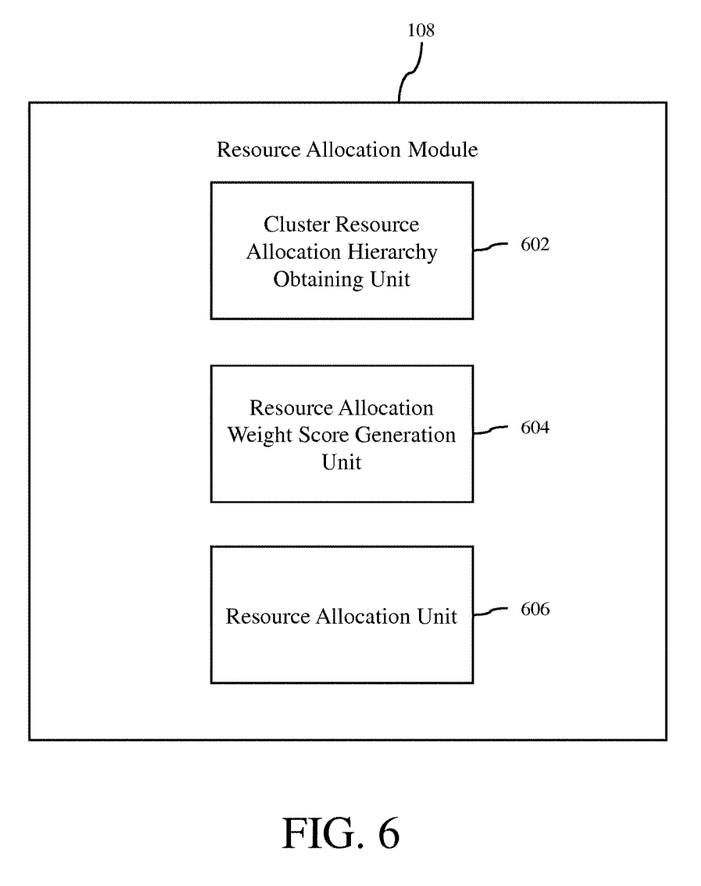
FIG. 6 is a block diagram of a resource allocation module included in a management computer of the computer system in accordance with an embodiment of the invention.

Turning now to FIG. 6, a block diagram of components of the resource allocation module 108 in the management computer 106 in accordance with an embodiment of the invention is shown. As illustrated in FIG. 6, the resource allocation module 108 includes a cluster resource allocation hierarchy obtaining unit 602, a resource allocation weight score generation unit 604, and an optional resource allocation unit 606. These components of the resource allocation module can be implemented as software, hardware or a combination of software and hardware. In other embodiments, the resource allocation module may include other components found in conventional resource allocation modules. In a particular implementation, the resource allocation module is a VMware vSphere® Distributed Resource Scheduler™ (DRS) installed in a VMware vCenter™ server that is executed by one or more processors of the server. However, in other embodiments, the resource allocation module may be installed in any other computer system.

In an operation of the resource allocation module 108 depicted in FIG. 6, the cluster resource allocation hierarchy obtaining unit 602 obtains a cluster resource allocation hierarchy of one of the host computer clusters C-1, C-2 . . . C-N and the resource allocation weight score generation unit 604 generates resource allocation weight scores for resource nodes in the cluster resource allocation hierarchy based on the number of powered-on client or clients in the resource nodes and/or the size of powered-on clients in the resource nodes. The resource allocation unit 606 allocates a resource to the resource nodes in the cluster resource allocation hierarchy based on the resource allocation weight scores of the resource nodes and/or the size of the client (e.g., the number of vCPUs and the memory size of the client).

The resource allocation weight score generation unit 604 can compute a resource allocation weight score of a resource node (e.g., a resource pool or a client) based on the number of powered-on client (e.g., a VM) or clients (e.g., VMs) in the resource node. As more clients are powered on in a resource pool, the resource allocation weight score of the resource pool increases. Consequently, more resources can be provided to the increasing number of clients.

In some embodiments, the resource allocation weight score generation unit 604 computes a resource allocation weight score of a resource node (e.g., a resource pool or a client) by multiplying a base allocation weight score with the number of powered-on clients in the resource node, which is also referred to as "shares per VM" method. For example, if a resource pool is marked as {expandable, 300

CPU shares (per VM), 200 memory shares (per VM)}, the effective shares of the resource pool is 300 CPU shares and 200 memory shares if the resource pool has only one powered-on VM.

In some other embodiments, the resource allocation weight score generation unit 604 computes a resource allocation weight score of a resource node (e.g., a resource pool or a client) based on the sizes of one or more child nodes of the resource node. The resource allocation weight score generation unit can compute a resource allocation weight score of a resource node by multiplying a base allocation weight score with the sum of the sizes of one or more child nodes of the resource node. In one embodiment, the resource allocation weight score generation unit 604 computes a resource allocation weight score of a resource node (e.g., a resource pool or a client) by multiplying a base allocation weight score with the total number of vCPU of powered-on clients in the resource node, which is also referred to as "shares per vCPU" method. For example, if a resource pool has 10 VMs with each VM having 2 vCPUs and 4 GB memory, and the resource pool is marked as {expandable, 600 CPU shares (per vCPU), 200 memory shares (per 100 MB memory)}, the effective shares of the resource pool is 6000 CPU shares and 80000 memory shares. In one embodiment, the resource allocation weight score generation unit calculates the size of a resource pool as the sum of the sizes of all the powered-on clients (e.g., VMs) in the resource pool. For example, if a resource pool has 10 VMs with each VM having 2 vCPUs and 4 GB memory, the resource pool is considered as having a size of 20 vCPUs and 40 GB memory and can be considered as a VM with 20 vCPUs and 40 GB memory for the purpose of computing resource allocation weight scores.

In some embodiments, the resource allocation weight score generation unit 604 computes a resource allocation weight score of a resource node (e.g., a resource pool or a client) based on user inputs. For example, the resource allocation module provides a user interface that allows a user or an administrator to set the "expandable" tag, which indicates that resource allocation weight scores for resource nodes are determined based on the number of powered-on clients in the resource nodes, and "shares per vCPU" or "shares per VM," which can be "high," "normal," "low," or a custom value. If a resource pool is set to have expandable shares (i.e., with the "expandable" tag), all its siblings are also set to have expandable shares.

In one embodiment, the resource allocation weight score generation unit 604 can set the resource allocation weight score of a resource pool to "high," "normal," "low," or "custom" based on user input. In one implementation, a "normal" resource allocation weight score means 1000× number of vCPUs for CPU shares and 10×memory size in MB for memory shares, a "high" resource allocation weight score is double the "normal" resource allocation weight score, and a "low" resource allocation weight score is half the "normal" resource allocation weight score. For example, a normal resource allocation weight score of a resource pool designates 4000 shares for CPU and 163840 shares for memory, which is equivalent to the "normal" shares of a VM with 4 vCPU and 16 GB memory. A high resource allocation weight score has twice as much shares as a normal resource allocation weight score, while a low resource allocation weight score shares has half as much shares as a normal resource allocation weight score. The resource allocation weight score generation unit can label a resource pool with a boolean tag, "use custom shares." If the boolean tag, "use custom shares," is set to true for a resource pool, all child resource pools and VMs under the resource pool must use custom shares. If the boolean tag, "use custom shares," set to false for a resource pool, all children under the resource pool must be syntactically labeled, e.g., as "high", "low", or "normal." The resource allocation weight score generation unit also select between "shares per vCPU" or "shares per VM."

Figure 7:
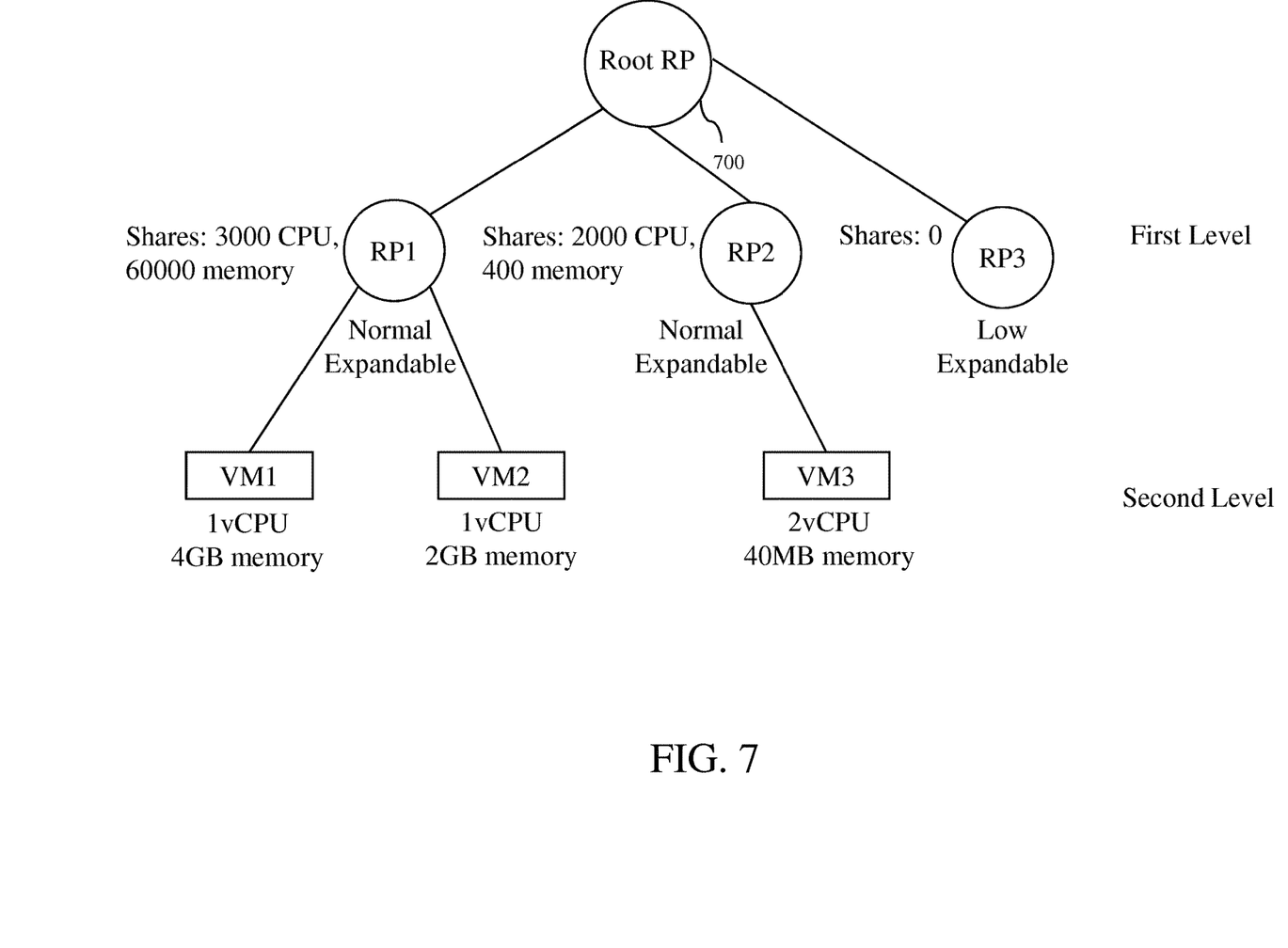
FIG. 7 depicts a resource allocation scheme for a cluster-level hierarchical organization of the computer system depicted in FIG. 1, according to one embodiment of the invention.

FIG. 7 depicts a resource allocation scheme for a cluster-level hierarchical organization of one of the host computer clusters C-1, C-2 . . . C-N depicted in FIG. 1, according to one embodiment of the invention. The cluster-level hierarchical organization depicted in FIG. 7 can be obtained by the cluster resource allocation hierarchy obtaining unit 602 and resource allocation weight scores for resource nodes in the cluster resource allocation hierarchy can be generated by the resource allocation weight score generation unit 604 based on the number of powered-on clients in the resource nodes. As illustrated in FIG. 7, a root RP 700 is at the root of the hierarchy. The root RP includes hierarchically organized RPs, "RP1," "RP2," "RP3," and VMs, "VM1," "VM2," "VM3." In particular, the resources available in the root RP are divided into resource pools RP1, RP2, RP3, which are located in a first level or tier that is directly underneath the root RP. The resources in RP1 are shared by VM1 and VM2, which are located in a second level or tier that is underneath the first level. The resources in RP2 are used by VM3, which is located in the second level.

In the cluster-level hierarchical organization depicted in FIG. 7, RP1 and RP2 have "expandable" and "normal" shares for both CPU and memory, and RP3 has "expandable" and "low" shares for both CPU and memory. A "normal" resource allocation weight score means 1000× number of vCPUs for CPU shares and 10×memory size in MB for memory shares. As illustrated in FIG. 7, RP1 has a share value of 3000 CPU and 60000 memory, and RP2 has a share value of 2000 CPU and 400 memory. RP3 has a share value of 0 because there is no powered-on VM or child resource pool under RP3. RP1 and RP2 share CPU resources of the root RP 300 in a ratio of 3:2 and memory resources of the root RP 700 in a ratio of 150:1.

Turning back to FIG. 6, when a user creates a resource pool with expandable "high" shares, the user may expect that all the clients (e.g., VMs) in the resource pool are highly important clients. If a resource pool has child resource pools, the resource allocation weight score generation unit 604 sets all of the child resource pools of the resource pool to have the same shares settings as the parent, e.g., also expandable and have the same "shares per vCPU" or "shares per client." In other words, the resource allocation weight score generation unit propagates shares settings to all child resource pools under a parent resource pool. In one embodiment, the resource allocation weight score generation unit can label a resource pool with a boolean tag, "children expandable." If the boolean tag, "children expandable set," is set to true at a resource pool, all the child resource pools under the resource pool will have "expandable" shares. If the boolean tag, "children expandable set," is set to false at a resource pool, the child resource pools under the resource pool will have "fixed" shares. A typical use case for such hierarchical "expandable" resource pool is, to group all the high priority VMs in one resource pool, then further divide them into sub-pools based on the departments to which they belong. The parent of an "expandable" resource pool can have either "fixed" or "expandable" shares.

Figure 8:
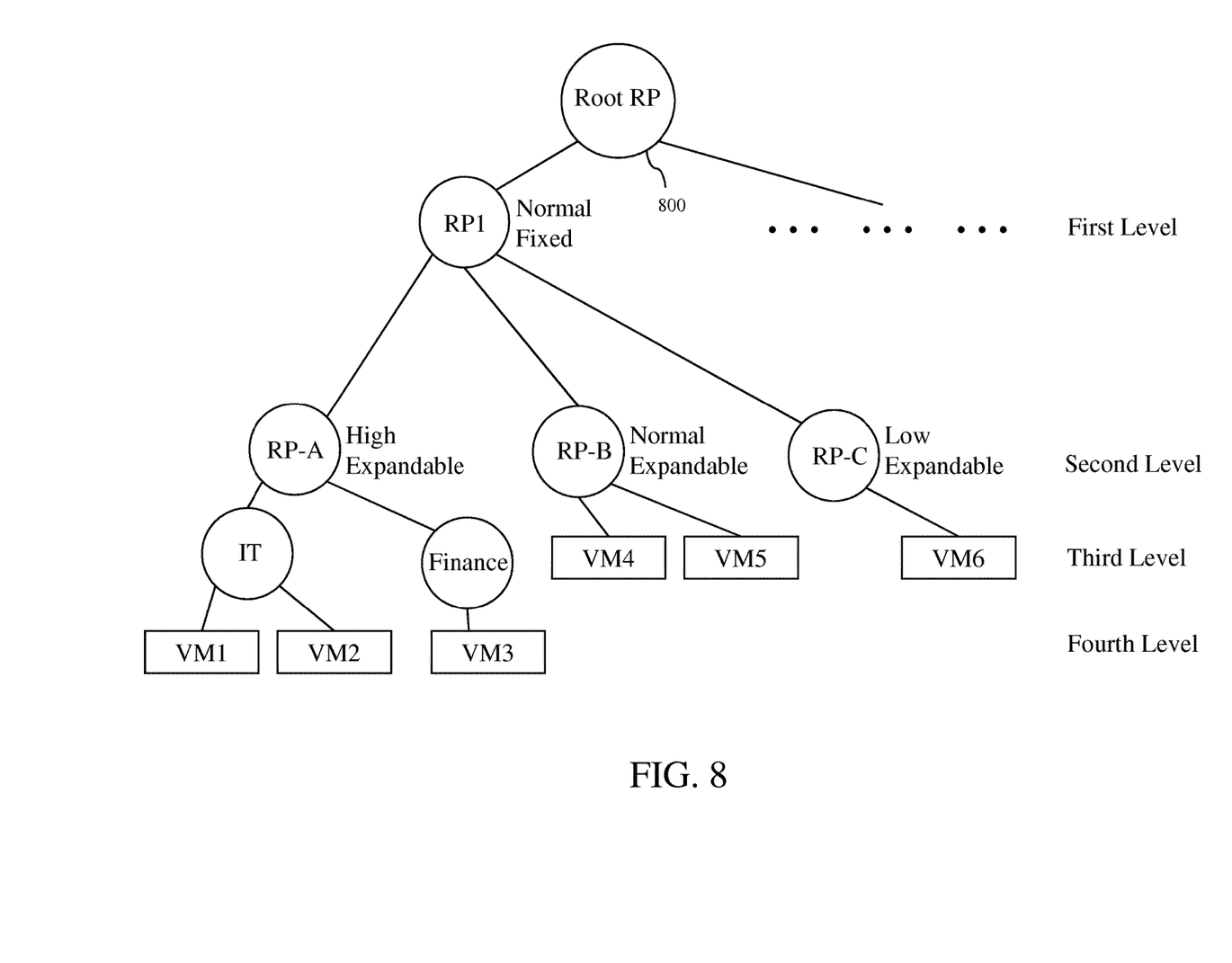
FIG. 8 depicts a resource allocation scheme for a cluster-level hierarchical organization of the computer system depicted in FIG. 1, according to another embodiment of the invention.

FIG. 8 depicts a resource allocation scheme in which the parent of "expandable" resource pools has "fixed" shares for a cluster-level hierarchical organization of one of the host computer clusters C-1, C-2 . . . C-N depicted in FIG. 1, according to one embodiment of the invention. The cluster-level hierarchical organization depicted in FIG. 8 can be obtained by the cluster resource allocation hierarchy obtaining unit 602 and resource allocation weight scores for resource nodes in the cluster resource allocation hierarchy can be generated by the resource allocation weight score generation unit 604 based on the number of powered-on clients in the resource nodes. As illustrated in FIG. 8, a root RP 800 is at the root of the hierarchy. The root RP includes hierarchical organized RPs, "RP1," "RP-A," "RP-B," "RP-C," IT department resource pool, and finance department resource pool, and VMs, "VM1," "VM2," "VM3," "VM4," "VM5," and "VM6." In particular, the resources available in the root RP are divided into resource pools RP1 and other resource pools (not shown), which are located in a first level or tier that is directly underneath the root RP. The resources available in RP1 are divided into resource pools RP-A, RP-B, RP-C, which are located in a second level or tier that is directly underneath RP1. The resources in RP-A are shared by RPs for IT and finance departments, which are located in a third level or tier that is underneath the second level. The resources in RP-B are shared by VM4 and VM5, which are located in the third level. The resources in RP-C are used by VM6, which is also located in the third level. The resources in RP (IT) are shared by VM1 and VM2, which are located in a fourth level or tier that is underneath the third level. The resources in RP (finance) are used by VM3, which is located in the fourth level.

In the cluster-level hierarchical organization depicted in FIG. 8, RP1 has "normal" and "fixed" shares, RP-A has "expandable" and "high" shares, RP-B has "expandable" and "normal" shares, RP-C has "expandable" and "low" shares. Because RP1 has "fixed" shares, the resource allocation to RP1 in the first level is not affected by the number of power-on VMs within the child resource pools, RP-A, RP-B, RP (IT) and RP (finance). As shown in FIG. 8, RP1 has its "children expandable" tag set to true and its "use custom shares" tag set to false. The direct child resource pools of RP1 (RP-A, RP-B, RP-C in FIG. 8) specify the shares per vCPU in terms of "high", "normal", "low". All the child resource pools under RP-A, RP-B, RP-C inherit the shares settings from their parent resource pools.

Figure 9:
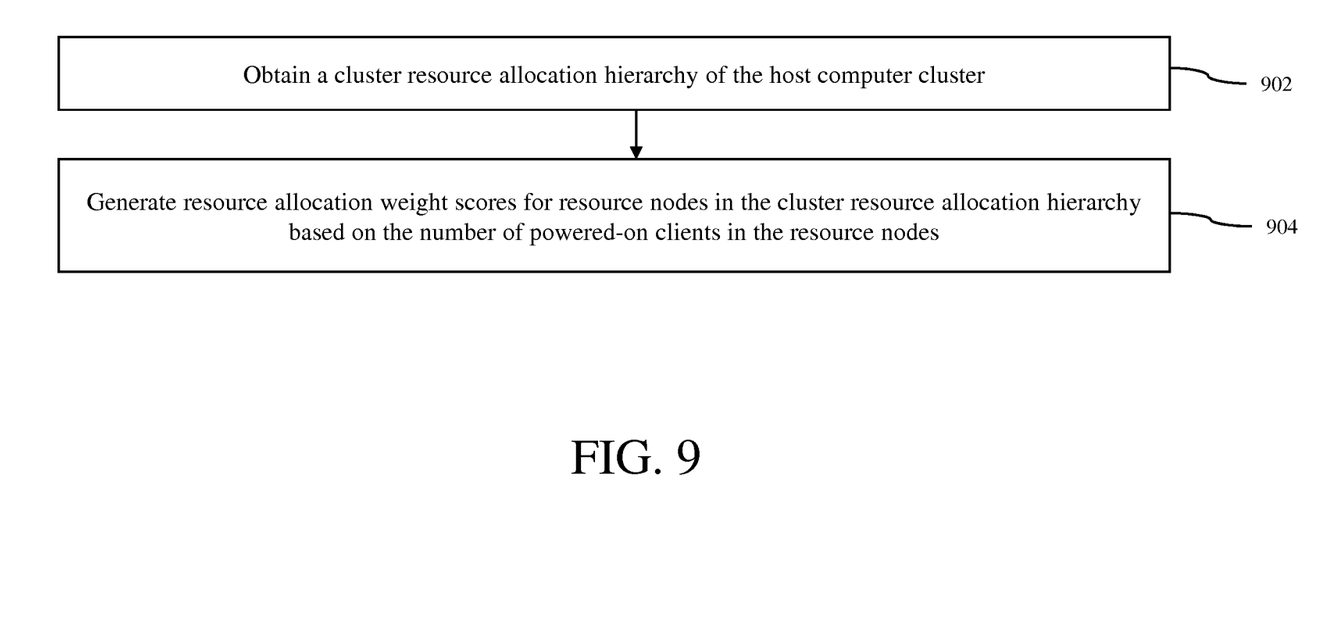
FIG. 9 is a flow diagram of a method for performing resource allocation for a host computer cluster in accordance with an embodiment of the invention.

A method for performing resource allocation for a host computer cluster in accordance with an embodiment of the invention is described with reference to a flow diagram of FIG. 9. At block 902, a cluster resource allocation hierarchy of the host computer cluster is obtained. At block 904, resource allocation weight scores for resource nodes in the cluster resource allocation hierarchy are generated based on the number of powered-on clients in the resource nodes.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing resource allocation for a host computer cluster, the method comprising:
    obtaining a cluster resource allocation hierarchy of the host computer cluster;
    generating a plurality of resource allocation weight scores for a plurality of resource nodes in the cluster resource allocation hierarchy that indicates the relative priority or importance of the resource nodes, wherein generating the plurality of resource allocation weight scores for the plurality of resource node includes computing a resource allocation weight score for each of the resource nodes using the number of powered-on clients in the corresponding resource node, the size of the powered-on clients and user input; and
    allocating a resource to the resource nodes in the cluster resource allocation hierarchy based on the resource allocation weight scores of the resource nodes.

2. The method of claim 1, wherein generating the plurality of resource allocation weight scores for the plurality of resource nodes comprises generating the resource allocation weight scores in proportion to the number of the powered-on clients in the resource nodes, including computing the resource allocation weight score for each of the resource nodes in proportion to the number of powered-on clients in the corresponding resource node.

3. The method of claim 1, wherein the resource nodes comprise a resource pool, and wherein generating the plurality of resource allocation weight scores for the plurality of resource nodes comprises computing a resource allocation weight score of the resource pool by multiplying a base allocation weight score with the number of powered-on clients in the resource pool.

4. The method of claim 1, wherein a first resource node of the resource nodes comprises at least one child resource node, and wherein generating the plurality of resource allocation weight scores for the plurality of resource nodes comprises computing a resource allocation weight score of the first resource node based on the total number of powered-on clients in the at least one child resource node.

5. The method of claim 1, wherein the resource nodes are located at the same level of the cluster resource allocation hierarchy.

6. The method of claim 1, further comprising allocating a resource to the resource nodes in the cluster resource allocation hierarchy based on the resource allocation weight scores of the resource nodes and the size of the powered-on clients in the resource nodes.

7. The method of claim 1, wherein the resource nodes comprise at least one resource pool and at least one client.

8. The method of claim 1, wherein the resource nodes comprise a plurality of resource pools, wherein at least one of the resource pools comprises a client.

9. The method of claim 1, wherein the powered-on clients include a powered-on virtual machine.

10. A non-transitory computer-readable storage medium containing program instructions for performing a resource allocation for a host computer cluster, wherein execution of the program instructions by one or more processors causes the one or more processors to perform steps comprising:
obtaining a cluster resource allocation hierarchy of the host computer cluster;
generating a plurality of resource allocation weight scores for a plurality of resource nodes in the cluster resource allocation hierarchy that indicates the relative priority or importance of the resource nodes, wherein generating the plurality of resource allocation weight scores for the plurality of resource node includes computing a resource allocation weight score for each of the resource nodes using the number of powered-on clients in the corresponding resource node, the size of the powered-on clients and user input; and
allocating a resource to the resource nodes in the cluster resource allocation hierarchy based on the resource allocation weight scores of the resource nodes.

11. The non-transitory computer-readable storage medium of claim 10, wherein generating the plurality of resource allocation weight scores for the plurality of resource nodes comprises generating the resource allocation weight scores in proportion to the number of the powered-on clients in the resource nodes, including computing the resource allocation weight score for each of the resource nodes in proportion to the number of powered-on clients in the corresponding resource node.

12. The non-transitory computer-readable storage medium of claim 10, wherein the resource nodes comprise a resource pool, and wherein generating the plurality of resource allocation weight scores for the plurality of resource nodes comprises computing a resource allocation weight score of the resource pool by multiplying a base allocation weight score with the number of powered-on clients in the resource pool.

13. The non-transitory computer-readable storage medium of claim 10, wherein a first resource node of the resource nodes comprises at least one child resource node, and wherein generating the plurality of resource allocation weight scores for the plurality of resource nodes comprises computing a resource allocation weight score of the first resource node based on the total number of powered-on clients in the at least one child resource node.

14. The non-transitory computer-readable storage medium of claim 10, wherein the resource nodes are located at the same level of the cluster resource allocation hierarchy.

15. The non-transitory computer-readable storage medium of claim 10, wherein the steps further comprise allocating a resource to the resource nodes in the cluster resource allocation hierarchy based on the resource allocation weight scores of the resource nodes and the size of the powered-on clients in the resource nodes.

16. The non-transitory computer-readable storage medium of claim 10, wherein the resource nodes comprise at least one resource pool and at least one client.

17. The non-transitory computer-readable storage medium of claim 10, wherein the resource nodes comprise a plurality of resource pools, wherein at least one of the resource pools comprises a client.

18. The non-transitory computer-readable storage medium of claim 10, wherein the powered-on clients include a powered-on virtual machine.

19. A computer system for performing resource allocation for a host computer cluster comprising:
a processor;
memory; and
a resource allocation module operably connected to the processor, wherein the resource allocation module is configured to:
obtain a cluster resource allocation hierarchy of the host computer cluster;
generate a plurality of resource allocation weight scores for a plurality of resource nodes in the cluster resource allocation hierarchy that indicates the relative priority or importance of the resource nodes; and
allocate a resource to the resource nodes in the cluster resource allocation hierarchy based on the resource allocation weight scores of the resource nodes,
wherein the resource allocation module is further configured to compute a resource allocation weight score for each of the resource nodes using the number of powered-on clients in the corresponding resource node, the size of the powered-on clients and user input to generate the plurality of resource allocation weight scores.

20. The computer system of claim 19, wherein the resource allocation module is further configured to compute the resource allocation weight scores in proportion to the number of the powered-on clients in the resource nodes, and wherein the resource allocation module is further configured to compute the resource allocation weight score for each of the resource nodes in proportion to the number of powered-on clients in the corresponding resource node.

21. The computer system of claim 19, wherein the resource nodes comprise a resource pool, and wherein the resource allocation module is further configured to compute a resource allocation weight score of the resource pool by multiplying a base allocation weight score with the number of powered-on clients in the resource pool.

22. The computer system of claim 19, wherein a first resource node of the resource nodes comprises at least one child resource node, and wherein the resource allocation module is further configured to compute a resource allocation weight score of the first resource node based on the total number of powered-on clients in the at least one child resource node.

23. The computer system of claim 19, wherein the resource nodes are located at the same level of the cluster resource allocation hierarchy.

24. The computer system of claim 19, wherein the resource allocation module is further configured to allocate a resource to the resource nodes in the cluster resource allocation hierarchy based on the resource allocation weight scores of the resource nodes and the size of the powered-on clients in the resource nodes.

25. The computer system of claim 19, wherein the resource nodes comprise at least one resource pool and at least one client.

26. The computer system of claim 19, wherein the resource nodes comprise a plurality of resource pools, wherein at least one of the resource pools comprises a client.

27. The computer system of claim 19, wherein the powered-on clients include a powered-on virtual machine.

* * * * *